N. THOMAS.
Car-Wheels.

No. 149,894. Patented April 21, 1874.

Witnesses
Herman Westinghouse
S. Howard Sprague

Inventor
Nicholas Thomas,
by G. H. Christy
his atty.

UNITED STATES PATENT OFFICE.

NICHOLAS THOMAS, OF CHICAGO, ILLINOIS.

IMPROVEMENT IN CAR-WHEELS.

Specification forming part of Letters Patent No. 149,894, dated April 21, 1874; application filed February 17, 1874.

*To all whom it may concern:*

Be it known that I, NICHOLAS THOMAS, of Chicago, in the county of Cook and State of Illinois, have invented a new and useful Improvement in Railway-Car Wheels and Axles; and I do hereby declare the following to be a full, clear, and exact description thereof, reference being had to the accompanying drawing, making a part of this specification, in which—

Figure 1:
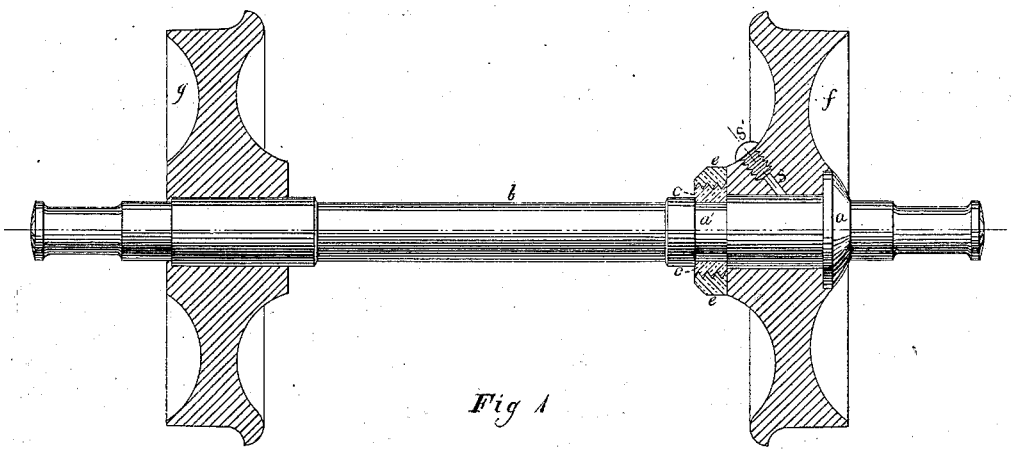
Figure 2:
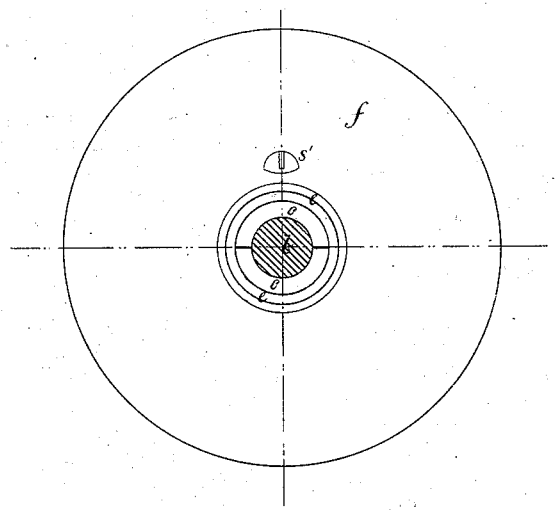

Figure 1, by a sectional elevation, illustrates my improvement; and Fig. 2 is a sectional view through $x\ x$ of Fig. 1.

Like letters of reference indicate like parts of each.

My invention relates to that class of wheels and axles, chiefly employed on railways, in which one wheel turns freely on its axle, the other being fixedly attached thereto; and consists in the construction of devices for securing such loose wheel against lateral play on the axle, such devices consisting of a fixed collar on the axle, against which the wheel bears on one side, a loose collar made in two or more parts or sections, arranged in a groove in the axle, against which the loose wheel bears on its other side, and a cylindrical screw-nut, which screws onto the loose sectional collar to hold it in place.

To enable others skilled in the art to make and use my improvement, I will proceed to describe its construction and operation.

The axle $b$ is made in the usual form, except that a fixed collar, $a$, is made thereon in suitable position for holding the loose wheel $f$ from moving laterally out of place in one direction. At a suitable place for attaching a collar to hold the wheel $f$ on the other side, I make a groove, $a'$, in the axle $b$, and insert therein a segmental collar, $c$, or the segments of a collar, such that when in place the hub of the wheel will bear thereon. To keep the segments or sectional pieces which form this collar or ring $c$ from falling radially out of the groove $a'$, I screw onto it the screw ring or nut $e$, the outer face of the collar $c$ and the inner face of the nut $e$ being suitably threaded for that purpose. This nut is preferably so made that when screwed on its inner end shall also bear against the hub of the wheel, and thereby coact with the collar $c$ in resisting the strain caused by a lateral thrust of the wheel in that direction, or a longitudinal thrust of the axle toward the wheel. In this way the wheel is held securely in the proper place, and, being free to revolve on the axle, is free from the well-known objections ordinarily encountered where both wheels are fixedly attached to the axle. In the drawing, the tight wheel is shown at $g$. The oil-hole $s$, closed by a cap, $s'$, is for the ordinary purposes of lubrication. It is obvious that the fixed collar $a$ may change places with the segmental collar, groove, and nut, or that the latter devices may be employed, though less advantageously, on both sides of the loose wheel.

What I claim as my invention, and desire to secure by Letters Patent, is—

1. The groove $a'$ in the axle $b$, in combination with the segmental collar $c$, nut $e$, and loose wheel $f$, substantially as set forth.

2. The axle $b$, having the groove $a'$ and fixed collar $a$, in combination with the fixed wheel $g$, loose wheel $f$, segmental collar $c$, and nut $e$, substantially as set forth.

In testimony whereof I, the said NICHOLAS THOMAS, have hereunto set my hand.

NICHOLAS THOMAS.

Witnesses:
HENRY GILBERT,
JOHN J. HANLY.